Dec. 3, 1929.  R. B. CHILLAS, JR  1,738,036
FRACTIONAL DISTILLATION APPARATUS
Filed Sept. 22, 1925  4 Sheets-Sheet 1

WITNESS:
Rob't R Kitchel

INVENTOR
Richard B. Chillas Jr.
BY
Cornelius L. Ehret
his ATTORNEY.

Dec. 3, 1929.  R. B. CHILLAS, JR  1,738,036
FRACTIONAL DISTILLATION APPARATUS
Filed Sept. 22, 1925  4 Sheets-Sheet 2

WITNESS:
Rob R Kitchel

INVENTOR
Richard B. Chillas Jr
BY
Cornelius D. Ehret
his ATTORNEY.

Dec. 3, 1929.  R. B. CHILLAS, JR  1,738,036
FRACTIONAL DISTILLATION APPARATUS
Filed Sept. 22, 1925   4 Sheets-Sheet 4

WITNESS:

INVENTOR
Richard B. Chillas Jr.
BY
Cornelius D. Ehret
his ATTORNEY

Patented Dec. 3, 1929

1,738,036

UNITED STATES PATENT OFFICE

RICHARD B. CHILLAS, JR., OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA

FRACTIONAL-DISTILLATION APPARATUS

Application filed September 22, 1925. Serial No. 57,912.

My invention relates to apparatus utilizable for effecting fractional distillation of a suitable composite liquid.

In accordance with my invention, a plurality of bubbler plates are disposed preferably at regular intervals in substantially vertical alignment in a fractionating tower or column, and each plate comprises a plurality of independent liquid-tight pans, or receptacles, sections, or equivalent members.

Further, in accordance with my invention, in a bubbler plate comprising a plurality of receptacles, at certain joints between adjacent receptacles the passage of vapor upwardly is prevented by a liquid seal, and similarly the passage of liquid downwardly is prevented by a vapor seal, each of said seals being formed as hereinafter described, while at certain other joints, bubbler caps are provided to pass the vapors into intimate contact with the refluxing liquid upon the bubbler plate.

Further in accordance with my invention, each bubbler plate, as aforesaid, comprises a plurality of substantially independent channels through which reflux liquid flows as it passes across the plate, and more particularly, the depth of the liquid in the various channels is maintained at a substantially uniform value.

Further in accordance with my invention, a plurality of streams of reflux liquid is passed from a suitable receptacle to a plurality of channels, or pans, or equivalent, comprised in a plate directly beneath, and more particularly, the distribution effected is determined by the size of the notches or weirs in said receptacle.

Further in accordance with my invention, liquid is retained in any bubbler plate in the series for the desired period of time, without utilizing gaskets, or other packing.

My invention resides in apparatus of the character hereinafter described and claimed.

For an illustration of some of the forms my invention may take, reference is to be had to the accompanying drawings, in which.

Figure 5:
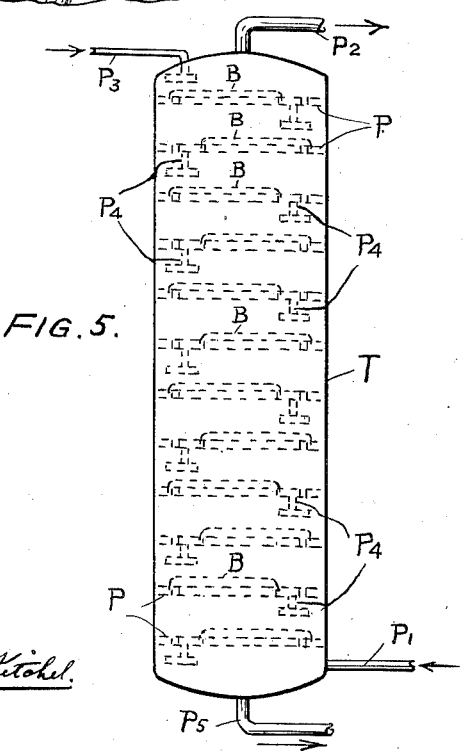
Fig. 5 is a diagrammatic elevational view of a fractionating tower.

Referring to Fig. 5, there is shown a fractionating column T having a plurality of bubbler plates P disposed in vertical alignment one above the other. The material to be fractionated, as a mixture of vapor coming, for example, from a suitable still, is delivered, at suitably elevated temperature, into the column T through a pipe $P^1$, preferably at a point below the lowermost plate P, the vapors passing upwardly under the bubbler caps B and thence through the pipe $P^2$ to a suitable condenser (not shown), a portion of the condensate returning to the column through the pipe P³ as reflux.

The reflux liquid passes downwardly through the column, as through the pipes P⁴, coming into intimate contact on the plates with the rising vapors to effect the necessary interchange of constituents for fractionation, whereupon the descending liquid becomes progressively leaner in lower boiling point constituents and upon eventually reaching the bottom of the column is drawn off through the pipe P⁵.

Figure 1:
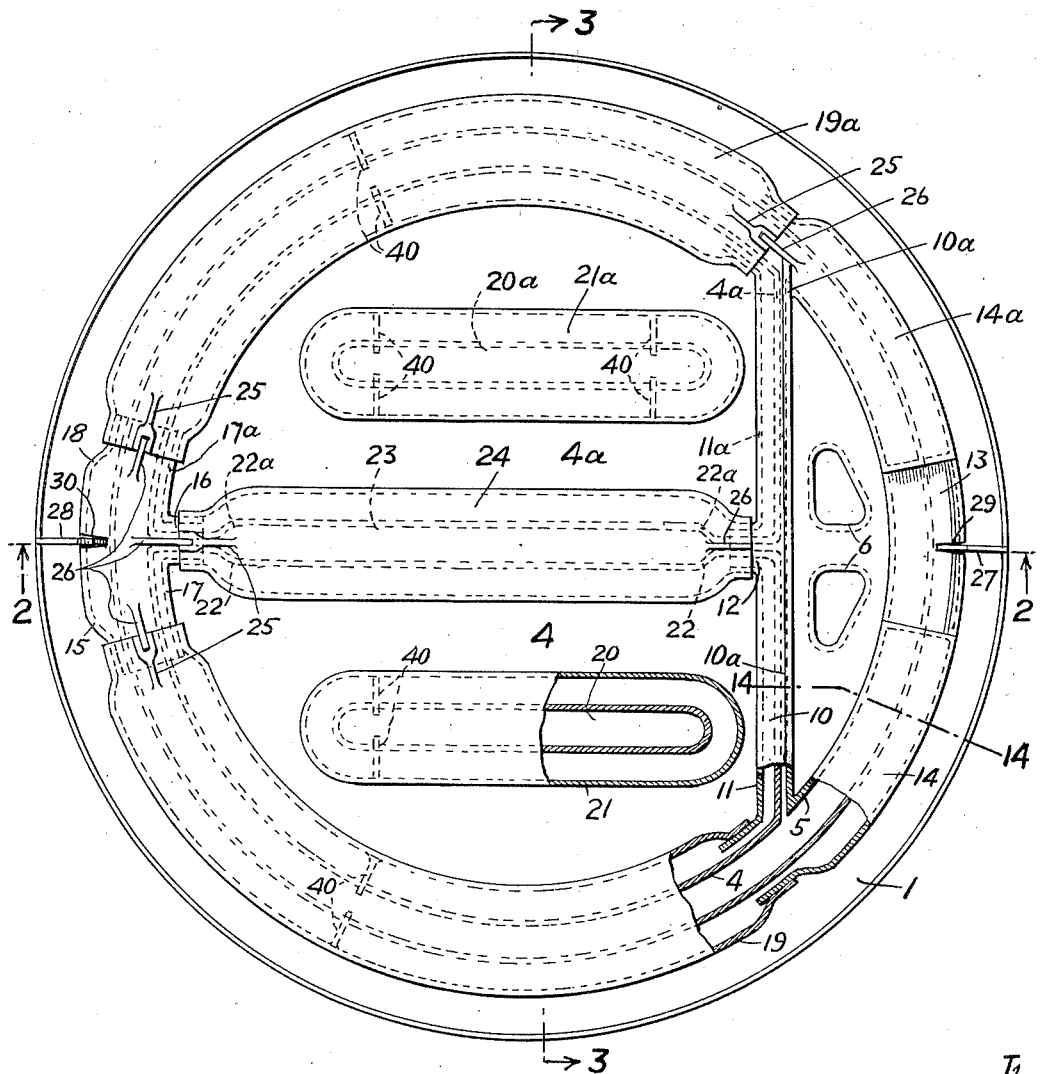
Fig. 1 is a plan view, partly in section, of a bubbler plate constructed in accordance with my invention.
Figure 2:
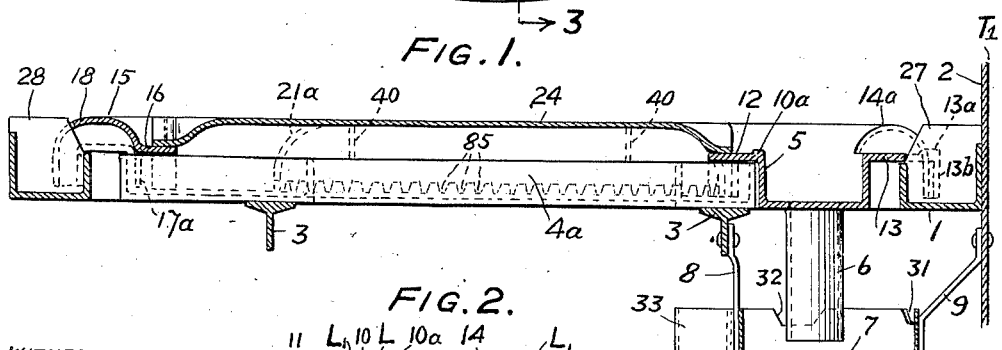
Fig. 2 is a vertical sectional view taken on the line 2—2 of Fig. 1, looking in the direction of the arrows.

My invention relates to a novel bubbler plate indicated generally at P (Fig. 5), one modification of which is shown more particularly in Figs. 1 and 2, as comprising an annular channel member 1 suitably secured, as by rivets (not shown), to the annular shell or casing 2 of the fractionating column T¹. A plurality of supporting members or beams 3, suitably secured to shell 2 or to channel member 1, support a plurality of receptacles or pans 4 and 4ª. A third pan 5, supported as hereinafter described, is aligned horizontally with pans 4 and 4ª, and is provided with one or more down-flow pipes 6 extending within and adjacent the bottom of a seal pan 7 suitably supported, as by rods 8 and 9, carried, respectively, by one of the beams 3 and the shell 2.

The wall of the pan 5 adjacent the pans 4 and 4ª is provided with a flange 10, lying on vertical end walls of said pans and terminating in walls 11 and 11ª extending, respectively, downwardly into each pan a distance somewhat greater than do the various bubbler caps, hereinafter described. A portion 12 of flange 10 is not bent downwardly, and, accordingly, engages a small portion of the tops of the vertical walls of the pans 4 and 4ª which extend at right angles to the aforementioned walls upon which the flange 10 rests (Figs. 1 and 2). Thus one side of pan 5 is supported in horizontal alignment with said pans. Flange 10 also comprises a raised portion 10ª utilizable as hereinafter described. The wall of pan 5 opposite the portion 12 of the flange 10 is provided with a flange 13, resting on the inner wall of channel 1, and therefore, supporting the other side of pan 5. Flange 13 comprises a raised portion 13ª corresponding to portion 10ª both utilizable as hereinafter described, and a portion 13ᵇ extending downwardly into channel 1. On either side of flange 13, the wall of pan 5 is provided with portions 14 and 14ª, curved upwardly and outwardly and then downwardly over the inner wall of and into channel 1. Said portions 14 and 14ª function as bubbler caps and extend downwardly into channel 1 distances somewhat less than does the portion 13ᵇ of flange 13 and walls 11 and 11ª extend into pans 4 and 4ª.

Across the shell diametrically opposite from flange 13, a T-shaped cap 15 comprises a flat horizontally extending portion 16 resting on a portion of the tops of the vertical end walls of pans 4 and 4ª which extend at right angles to the walls of the pans upon which the flange 10 rests, and on either side of said portion, walls 17 and 17ª extend, respectively, downwardly into the pans 4 and 4ª distances substantially the same as walls 11 and 11ª. A portion 18 of said cap is curved upwardly and outwardly and then downwardly over the inner wall of, and into channel 1. Said portion 18 functions as a bubbler cap and extends downwardly into channel 1 a distance substantially the same as do portions 14 and 14ª of the walls of pan 5.

One limb of a bubbler cap 19, preferably shaped substantially as an inverted U (Fig. 3), extends downwardly into the pan 4, spaced from, and substantially parallel with, its curved wall, while the other limb extends downwardly into the channel 1 and is likewise spaced from, and substantially parallel with, the inner wall of said channel. The crown of bubbler cap 19 extends above the top surfaces of channel 1 and pan 4 a sufficient distance to permit free passage of vapor, as hereinafter described. One end of cap 19 is suitably shaped and fitted over the correspondingly shaped end of cap 15, while the other end of cap 19 similarly fits over the protruding correspondingly shaped end of wall 11 and portion 14 of pan 5.

Another bubbler cap 19ª, corresponding to and interchangeable with cap 19, is similarly located above pan 4ª and channel 1, and its ends are correspondingly connected, respectively, to cap 15 and the wall 11ª and portion 14ª of pan 5.

Pan 4 is provided with a suitable elongated vapor uptake or chimney 20 covered by a bubbler cap 21 and the corresponding pan 4ª is provided with a similar chimney 20ª, covered by a bubbler cap 21ª interchangeable with cap 21.

The walls of pans 4 and 4ª facing each other are indented, as indicated at 22 and 22ª (Fig. 1), thereby forming another vapor uptake or chimney 23 covered by a bubbler cap 24, suitably shaped at one end to fit over flange 12 and similarly shaped at its other end to fit over the horizontally extending portion 16 of cap 15.

It is to be understood that bubbler caps 19, 19ª, 21, 21ª and 24 extend downwardly into their respective pans or receptacles distances somewhat less than do the walls 11 and 11ª.

Figure 6:
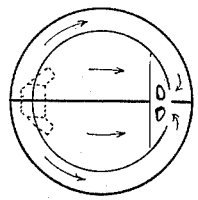
Fig. 6 is a diagrammatic view illustrating the paths taken by the liquid as it flows across a plate constructed in accordance with Fig. 1.
Figure 7:
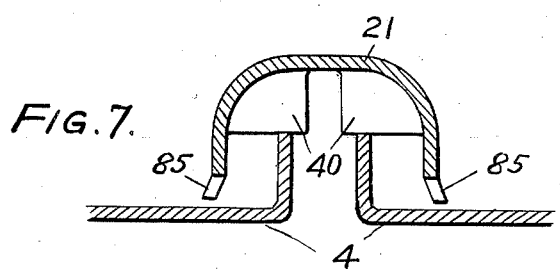
Fig. 7 is a vertical sectional view illustrating a bubbler cap supported by adjacent receptacles.

In accordance with my invention, reflux liquid is distributed among the various receptacles, as the channel 1 and pans 4 and 4ª, comprising one plate, by causing the liquid to fall from a plurality of openings in the seal pan immediately above, as hereinafter described. As illustrated diagrammatically in Fig. 6, it is desirable that this liquid shall pursue separate paths when flowing across the plate to the down-flow pipes 6 whence it passes to the seal pan and thence to the plate below. To this end, such liquid as enters the channel 1 is caused to pass to the down-flow pipes along a path distinct from that taken by the liquid entering the pans 4 or 4ª.

Figure 8:
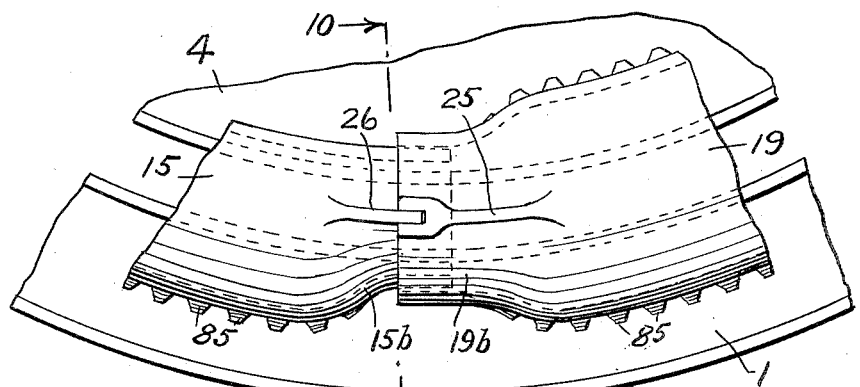
Fig. 8 is a plan view illustrating the type of junction effected between adjacent bubbler caps.
Figure 9:
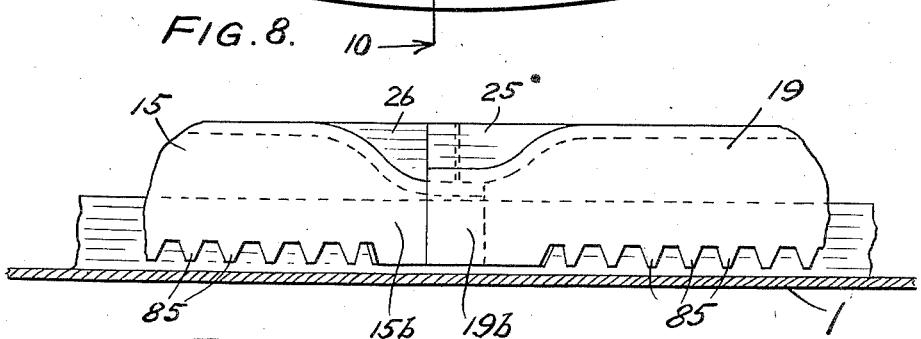
Fig. 9 is a view, partly in section and partly in elevation, of the bubbler caps shown in Fig. 8.
Figure 10:
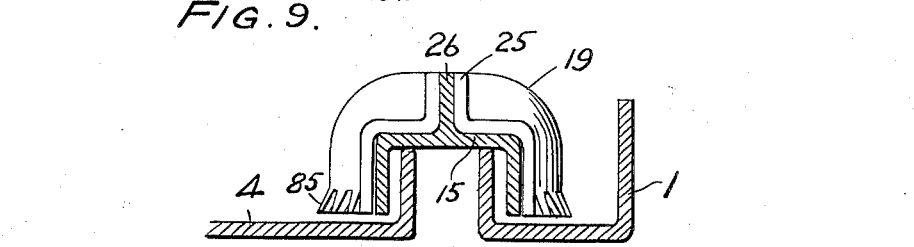
Fig. 10 is a vertical sectional view on the line 10—10 of Fig. 8, looking in the direction of the arrows.

It will be observed that the bubbler cap 19 prevents passage of liquid from channel 1 to pan 4 and vice versa throughout its entire length, except where junction is effected with the cap 15 and pan 5 as hereinbefore described. In order to obtain a substantially tight joint, for example, between caps 15 and 19, it is preferable that the end of each member be constricted laterally and vertically as indicated in Figs. 8 and 9 at 15ᵇ and 19ᵇ. In so doing, however, a channel is formed through which liquid might pass toward and from the pan 4. To prevent passage of liquid in this manner, a raised portion 25 is provided with a slot extending through its supporting structure receiving a substantially vertical wall 26 rising from the adjacent bubbler cap, as cap 15. In this manner there is formed a dam or obstruction between channel 1 and pan 4.

Similar dams or obstructions are provided between the ends of pan 5 and caps 19 and 19ª and between the latter and cap 15.

To prevent passage of liquid from pan 4 to pan 4ª, and vice versa, a dam or obstruction as described above is provided between the cap 24 and the horizontally extending portion 16 of cap 15.

Preferably, channel 1 is divided into two distinct parts by two vertical walls 27 and 28 welded, or otherwise suitably secured to said channel. Wall 27 is received in a slot 29 of the flange 13, and, preferably is symmetrically arranged with respect to flange 13 and the down-flow pipes 6. The second vertical wall 28, preferably located diametrically opposite from wall 27, likewise extends across the channel 1, to which it is welded, or otherwise suitably secured and is received in a slot 30 of the curved portion 18 of cap 15.

It will be observed that the channels through which the reflux liquid passes are maintained substantially independent one of the other by utilizing the various dams or obstructions, as aforesaid. In this manner, the liquid is distributed in a substantially predetermined manner over the surface of the plate even though the column should be out of vertical alignment.

Figure 3:
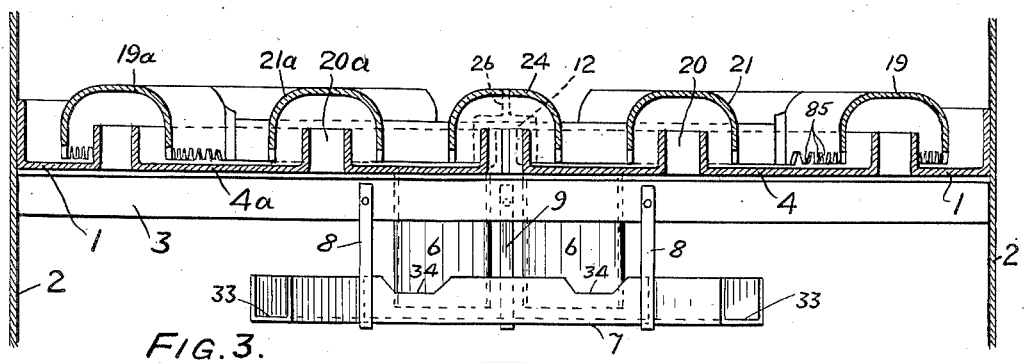
Fig. 3 is a vertical sectional view taken on the line 3—3 of Fig. 1, looking in the direction of the arrows.
Figure 4:
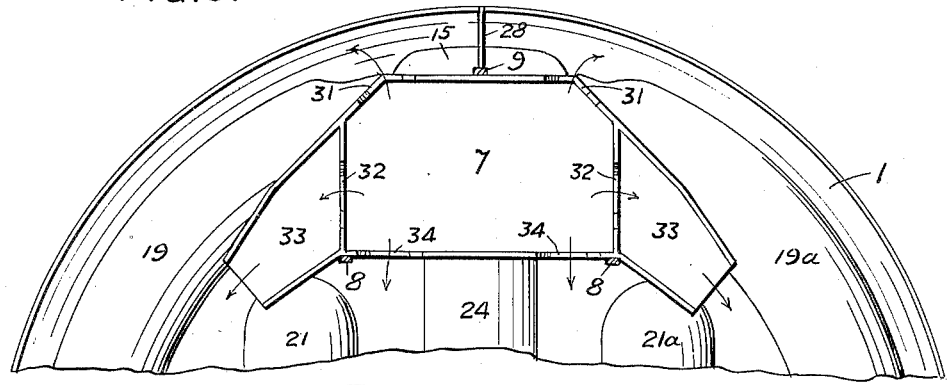
Fig. 4 is a plan view of a reflux distributing pan.

Referring to Figs. 3 and 4, the pan 7 is illustrated as comprising a plurality of weirs or notches suitably arranged to effect the desired liquid distribution into the various pans comprised in the bubbler plate below. As shown in Fig. 5, it is desirable that plates P be placed in such a manner as to bring the down-flow pipes of alternate plates on diametrically opposite sides of the column.

As a result, notches 31 in pan 7 distribute liquid into channel 1 below, on either side of the wall 29 in that channel, while notches 32 pass liquid to troughs 33, whence it flows to pans 4 and 4ª in the space between bubbler caps 19 and 21 on one side of the column and in the space between bubbler caps 19ª and 21ª on the other side of the column. Notches 34 effect further delivery of liquid respectively to each of said pans between bubbler caps 21 and 24 and between bubbler caps 21ª and 24.

It is to be noted that the liquid level in pan 7 is defined by the depth of the various notches 31, 32, etc., and that the down-flow pipes 6 extend into the liquid a substantial distance below the tops of the notches, thereby effecting a liquid seal and preventing passage of the ascending vapors through said pipes. Obviously, within the scope of my invention, the quantity of liquid passing in various directions may be controlled by varying the dimensions of the notches or weirs aforesaid. Furthermore, it is desirable that the seal pan be of relatively small size in order to minimize the effect of minor inaccuracies of level.

Obviously, the various bubbler caps will be suitably supported or retained in position above the vapor uptakes or chimneys. As illustrated, supporting lugs 40 disposed interiorly, and laterally of the various caps rest upon the upturned walls of adjacent receptacles and function to support the caps in proper position.

The operation is as follows:

Reflux liquid falling in a plurality of streams from a seal pan passes into the various receptacles in the plate immediately below, and since the down-flow pipes are situated at opposite sides of alternate plates, it is necessary that the liquid pass over substantially the entire width of each plate as it pursues its course downwardly through the column. As illustrated diagrammatically in Fig. 6, portions of the reflux liquid flow in opposite directions around the channel 1 from a common point, such as the wall 28 and passes into the pan 5 over the flange 13 while another portion of the liquid received by pans 4 and 4ª flows along separate paths over the flange 10 likewise into pan 5. Obviously, therefore, the height of raised portions 10ª and 13ª comprised respectively in flanges 10 and 13 finally defines the liquid level in the various receptacles, which is such that the joints between bubbler cap 19 and the end of pan 5, between bubbler cap 19ª and the other end of pan 5, between bubbler cap 24 and flange 12, and between the ends of cap 15 and the bubbler caps 19, 19ª and 24 are immersed in the reflux liquid. The edges of the various bubbler caps around which the vapor passes are extended well below such level, but not as deep as the various cover caps around whose edges it is intended that the vapor shall not pass.

Vapor from any convenient form of still in ascending through an individual bubbler plate P passes into and through the reflux liquid along a plurality of distinct paths. That portion of the vapor passing through chimneys 20 and 20$^a$ engages bubbler caps 21 and 21$^a$, respectively, and is guided thereby outwardly, downwardly and then into the reflux liquid, through which it passes upwardly toward the bubbler plate above. That portion of the vapor passing through the space bounded by the inner circumferential wall of channel 1 and the adjacent outer wall of pan 4 engages bubbler cap 19 and is guided thereby outwardly in both directions downwardly and thence into the reflux liquid. Vapor passing upwardly through the space bounded by the inner circumferential wall of channel 1 and the outer wall of pan 4$^a$ is guided into the reflux liquid in a similar manner. Vapor passing upwardly into contact with the curved portion 18 of cap 15 passes only in an outward and downward direction into the reflux liquid in channel 1. Vapor passing upwardly through the space bounded by the inner circumferential wall of channel 1 and the outer curved wall of pan 5 contacts with the curved portions 14 and 14$^a$ of said pan and passes only outwardly and downwardly into the reflux liquid in channel 1. It is to be noted that flange 13 prevents passage of any substantial amount of vapor into channel 1 immediately adjacent and on either side of wall 27.

Figure 11:
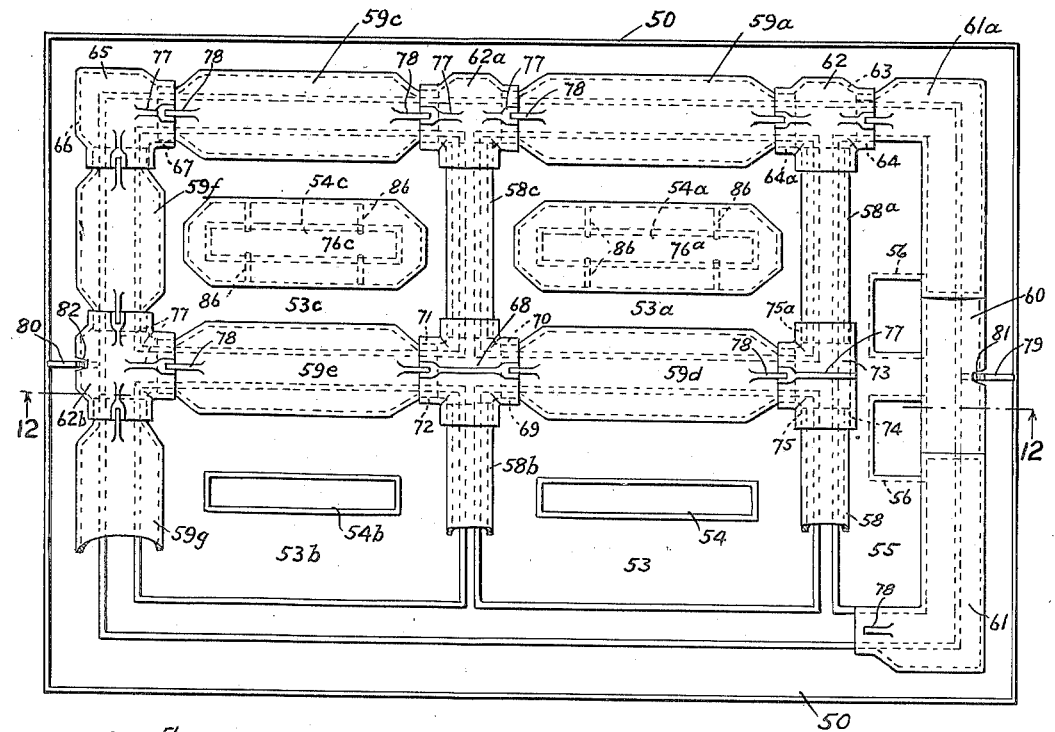
Fig. 11 is a plan view, with some parts broken away, of a modified form of bubbler plate.
Figure 12:
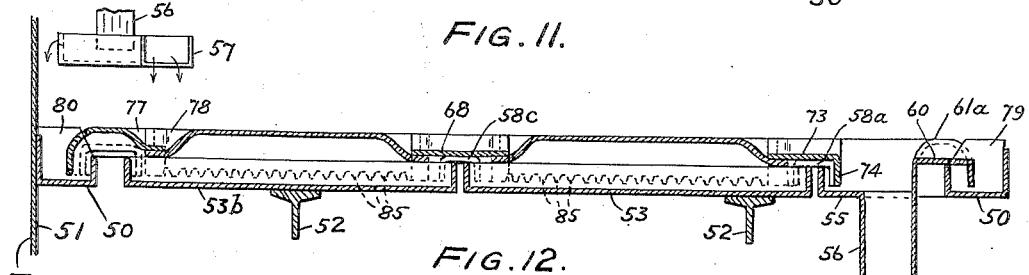
Fig. 12 is a vertical sectional view taken on the line 12—12 of Fig. 11, looking in the direction of the arrows.

Referring to Figs. 11 and 12, there is illustrated a modified form of my invention embodying a polygonal column utilizing a relatively large number of small pans or receptacles of convenient form. These may be circular, hexagonal, rectangular, or other suitable shape. In a construction of this character, the majority of the pans and bubbler caps are interchangeable, thereby permitting the construction of columns of various forms and sizes by using the same sections and varying the number accordingly. Furthermore, the small sections decrease the weight of the column and are easier to handle.

As shown, a rectangular channel or trough 50 is suitably secured, as by rivets (not shown), to the rectangular shell 51 of the column T$^2$. A plurality of supporting members or beams 52 suitably secured to shell 51 support a plurality of similar interchangeable pans or receptacles, 53, 53$^a$, 53$^b$, 53$^c$, each provided with vapor uptakes or chimneys 54, 54$^a$, 54$^b$, 54$^c$. Another rectangular pan or receptacle 55 disposed adjacent one wall of tower 51 carries one or more down-flow pipes 56 dipping into a notched seal pan 57 supported therebeneath in any suitable manner (not shown).

The crown of a cover member 58, shaped substantially as an inverted U, rests upon adjacent walls of pans 53 and 55, and the limbs of said member extend respectively into said pans substantially parallel to said walls. Similar members 58$^a$, 58$^b$ and 58$^c$ interchangeable one with the other and with cover member 58 traverse, respectively, the spaces between adjacent walls of pans 53$^a$ and 55, between adjacent walls of pans 53 and 53$^b$, and between adjacent walls of pans 53$^a$ and 53$^c$. Under some circumstances, it may be desirable to raise the crowns of the various cover members and thereby utilize the same as bubbler caps to pass vapors into and through the reflux liquid.

One limb of a bubbler cap 59$^a$, shaped substantially as an inverted U, extends downwardly into pan 53$^a$, spaced from and substantially parallel with the inner wall of said channel. The crown of bubbler cap 59$^a$ extends above the top surfaces of channel 50 and pan 53$^a$ a sufficient distance to permit free passage of vapor. Each end of the bubbler cap is suitably shaped to form substantially tight junctions with certain cover caps, hereinafter described.

Similar bubbler caps 59$^c$, 59$^d$ and 59$^e$ traverse, respectively, the spaces between adjacent walls of channel 50 and pan 53$^c$, between pans 53$^b$ and 53$^c$ and between pans 53 and 53$^a$. Other similar bubbler caps (not shown) traverse, respectively, the spaces between adjacent walls of pan 53 and channel 50 and between pan 53$^b$ and channel 50.

One limb of a bubbler cap 59$^f$ extends downwardly into pan 53$^c$, spaced from and substantially parallel with its outer wall, while the other limb extends downwardly into the channel 50, and is likewise spaced from and substantially parallel with the inner wall of said channel. As described with respect to bubbler caps 59$^a$, 59$^c$, etc., the crown of cap 59$^f$ extends some distance above the top surfaces of channel 50 and 53$^c$. Furthermore, each end of this cap is shaped in a manner corresponding to the ends of caps 59$^a$, 59$^c$, etc.

Another bubbler cap 59$^g$, a duplicate of cap 59$^f$, traverses the space between adjacent faces of pans 53$^b$ and channel 50.

A flange 60 of the outer wall of pan 55, preferably symmetrically arranged with respect to down-flow pipes 56, rests upon the inner wall of channel 50 and an angular extension of said flange extends downwardly into said channel (Fig. 12). On either side of said flange, the wall of pan 55 is provided with portions 61 and 61$^a$, curved upwardly and outwardly and then downwardly over the inner wall of and into channel 50. The free ends of curved portions 61 and 61$^a$ are each shaped in a manner corresponding to the ends of bubbler caps 59$^a$, 59$^c$, etc.

A T-shaped cover cap 62 comprises a wall 63 curved outwardly and downwardly into channel 50, and a pair of L-shaped walls 64 and $64^a$, extending downwardly, respectively, into pans 55 and $53^a$. This cover cap fits over one end of bubbler cap $59^a$, the adjacent end of curved portion $61^a$ of pan 55, and one end of cover member $58^a$.

A plurality of cover caps similar to and, therefore, interchangeable with cap 62, are provided. One, namely, cap $62^a$, fits over the adjacent ends of bubbler caps $59^a$ and $59^c$ and cover member $58^c$. Another, namely, cover cap $62^b$ interchangeable with the other cover caps, as cap 62, except for slot 82, hereinafter described, fits over the adjacent ends of bubbler caps $59^f$, $59^g$ and $59^e$. Similar cover caps (not shown) are individually utilized at the junctions, respectively, of pans 53 and $53^b$ and channel 50 opposite member $62^a$, and of pans 53 and 55 and channel 50 opposite member 62.

An L-shaped cover cap 65 comprises an L-shaped wall 66 curved outwardly and downwardly into channel 50, and an L-shaped wall 67 extending downwardly into pan $53^c$. This cap fits over adjacent ends of bubbler caps $59^c$ and $59^f$.

Another duplicate L-shaped cover cap (not shown) fits over adjacent ends of bubbler cap $59^g$ and the bubbler cap (not shown) lying over the space between adjacent walls of pan $53^b$ and channel 50.

A cross-shaped cover cap 68 comprises four L-shaped walls 69, 70, 71 and 72, extending downwardly, respectively, into pans 53, $53^a$, $53^b$ and $53^c$. This cap fits over adjacent ends of cover members $58^b$ and $58^c$ and bubbler caps $59^d$ and $59^e$.

A T-shaped cover cap 73 comprises a wall 74 extending downwardly into pan 55, and L-shaped walls 75 and $75^a$ extending downwardly, respectively, into pans 53 and $53^a$. This cap fits over adjacent ends of cover members 58 and $58^a$ and bubbler cap $59^d$.

The vapor uptake or chimney $54^a$ in pan $53^a$ is provided with a bubbler cap $76^a$. Vapor uptake $54^c$ is likewise provided with a duplicate bubbler cap $76^c$, as are the chimneys 54 and $54^b$ of pans 53 and $53^b$.

As was the case with the form of my invention first described, it is desirable in the present instance that each of the various bubbler caps be constricted at their respective ends, to fit under the cover caps, and in order to prevent passage of liquid in an undesired direction across the depressed portions of the bubbler caps, it is necessary to close the passages thus formed. To this end, it is desirable to utilize the construction described aforesaid with respect to Figs. 1, 2, et seq. and, accordingly, a vertical wall 77 on a cover cap, as cap 62 is slotted at one end in alignment with a slot in the end wall of said cover cap to receive a substantially vertical wall 78 on a bubbler cap, as cap $59^a$ adjacent thereto.

Normally, it is intended that liquid shall flow from channel 50 into pan 55 only across flange 60 (Fig. 11). Accordingly, dams or obstructions, as aforesaid, should be placed at each above described passage to prevent flow of the liquid from channel 50 into one of the pans 53, $53^a$, $53^b$ and $53^c$, or along any path other than across flange 60 into the pan 55. It is also intended that liquid shall flow in separate paths to pan 55 from pans $53^b$ and 53 on the one hand, and pans $53^c$ and $53^a$ on the other hand. To this end, dams or obstructions should likewise be placed in each of such passages to prevent flow of liquid from pan $53^b$ to pan $53^c$, or vice versa, and from pan 53 to pan $53^a$, or vice versa.

Further, it is desirable that channel 50 be divided into two distinct parts by two vertical walls 79 and 80, welded, or otherwise suitably secured to said channel and received respectively in a slot 81 of flange 60 and a slot 82 of the downwardly extending portion of cover cap $62^b$. Preferably, wall 80 is located directly across the column from wall 79 and extends across channel 50, to which it is secured in any suitable manner.

As with Figs. 1, 2, et seq., it is intended that vapor shall not pass under the lower edge or edges of certain members, and, accordingly, these members are extended to a greater depth in the various pans or receptacles than are the various bubbler caps, around whose lower edges the vapor is to pass. There is no strict rule controlling the use of a certain member as a bubbler cap or as a cover cap. However, it is desirable that members 58, $58^a$, $58^b$ and $58^c$ should be extended to a greater depth in the various receptacles than are the bubbler caps $76^a$, $76^c$, etc., in which case said members function exclusively as cover caps or cover members.

Member 62, although designated herein as a cover cap, in reality functions both as a cover cap and as a bubbler cap. That is, vapor does not pass around walls 64 and $64^a$ which are extended to a greater depth than wall 63, around which vapor is to pass.

Similarly, the L-shaped wall 67 of cap 65 is extended further into pan $53^c$ than wall 66 extends into channel 50 while each of the L-shaped walls 69, 70, 71 and 72 of cap 68 are extended to a depth in the various receptacles sufficient to prevent passage of vapor into the reflux liquid. Likewise, walls 75 and $75^a$ of cap 73 are extended respectively into pans 53 and $53^a$ to a similar depth.

Figure 13:
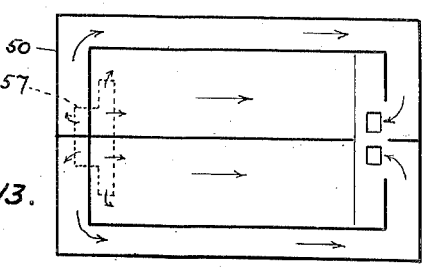
Fig. 13 is a diagrammatic view illustrating the paths taken by the liquid as it flows across a plate constructed in accordance with Fig. 11.

The operation of the modification of my invention illustrated by Figs. 11, 12 and 13 is essentially the same as described with respect to Figs. 1, 2, et seq. Reflux liquid flowing across a plate through the several channels passes into the down-flow pipes 56 and thence through the notches in the seal pan to the corresponding plate below. Meanwhile, vapor rises through the various chimneys and contacting with the respective bubbler caps is guided into and through the liquid flowing along the plate to effect fractionation.

In each instance, where vapors pass through an uptake or chimney into engagement with a bubbler cap and thence into and through the reflux liquid, it is desirable, but not absolutely necessary, that the lower edge or edges of such bubbler caps be provided with a series of notches or serrations, as indicated at 85 on the various figures of the drawings. It is also desirable, but not absolutely necessary, that such edge or edges be flared outwardly so that bubbles when rising upwardly through the liquid will not engage the side walls of the cap.

Further, it is to be understood that the various caps will be suitably retained in position, as for example, by utilizing supporting lugs 86 formed interiorly thereof.

As hereinbefore stated, reflux liquid is retained in any bubbler plate of the series without utilizing gaskets, or other packing, despite the fact that each bubbler plate consists of a number of pans spaced one from the other. It is intended that all such spaces traversed by a cover cap or cover member shall not pass vapor in one direction or reflux liquid in the reverse direction, and to this end the various cover caps or cover members have been extended a greater depth in the various receptacles than have the bubbler caps around whose lower edges it is intended that the vapor shall pass.

Figure 14:
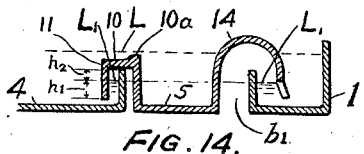
Fig. 14 is a vertical sectional view taken on the line 14—14 of Fig. 1.

As hereinbefore stated, it is intended that flange 10 and wall 11 shall function as a cover cap and curved portion 14 as a bubbler cap. Accordingly, in Fig. 14, I have shown wall 11 extending a greater distance downwardly into pan 4 than curved portion 14 extends into channel 1. The relation of bubbler cap 14 to channel 1 is such that vapor may freely rise through the chimney $b^1$ into engagement with the interior surface of said cap thence downwardly around the lower edge thereof, and then upwardly through the liquid. Flange 10 engages the upturned edge of receptacle 4, but since gaskets or other packing are not utilized, the union is insufficiently tight to prevent passage of vapor in one direction and the passage of liquid in reverse direction.

When the column is in operation, vapors pass upwardly through the vapor uptakes, as chimney $b^1$, and emerge from beneath the edges of the bubbler caps, as portion 14. At the same time, the reflux liquid, flowing across the plate assumes a lever L, Fig. 14, determined by the height of raised portions $10^a$ and $13^a$, Fig. 1, or members 58, $58^a$ and 60, Fig. 11, and by the quantity of reflux liquid flowing over said raised portions or members. The pressure exerted by the vapors rises to a value sufficient to displace the liquid interiorly of the bubbler and cover caps and cause the same to assume a liquid lever $L^1$ under the aforesaid caps. Thereafter, the vapors escape around the lower surfaces of the bubbler caps, as portion 14, Fig. 14, the pressure of the vapors meanwhile remaining substantially constant. Since the various cover caps, as flange 10 and wall 11, Fig. 14, extend downwardly into the various receptacles a greater distance than the bubbler caps, there still remains interiorly of each cover cap a column of liquid of height $h^1$, preventing escape of vapors around the lower surfaces of the various cover caps.

As stated above, the pressure exerted by the vapors increases to such value as to cause a liquid lever $L^1$ interiorly of the various cover caps, thereby forming a vapor seal of height $h^2$. Due to the presence of this column of vapor, the reflux liquid is prevented from passing over the upper edges of those receptacles traversed by cover caps and thence downwardly through the column.

When utilizing bubbler plates of the character described above, leakage of liquid from plate to plate is prevented as the liquid containing portions are continuous structures with upturned sides. In the prior art, it is common to use flat plates bolted to supporting flanges or to each other, with gasketed joints. With such constructions, unsatisfactory results are obtained due to leakage caused by deterioration of the gaskets, with subsequent impairment of the operating efficiency.

In a plate constructed with gasketed joints, it is necessary to limit the number and extent of such joints to a minimum in order to avoid troublesome leakage. In a plate constructed in accordance with my invention, the necessity for thus limiting the joints is eliminated, and accordingly, it is practicable to make the plate in small, easily handled sections, many of which can be made interchangeable. The accessibility and ease of assembly thus obtained result in a distinct advantage over the common practice of bolted or riveted plates.

Furthermore, bubbler plates constructed in accordance with my invention may be formed from a plurality of relatively small sections, and accordingly, the size of the plate may be much larger than is feasible when constructed from a single piece of material. As a result, bubbler plates of the type herein disclosed may be handled with ease, since the size is smaller and less thickness of material is employed to give the requisite strength.

Another advantage of this type of construction resides in the fact that the absence of gaskets permits the component parts to be spaced one from the other. As a result, limited movement of the parts is permissible, such, for example, as may be caused by the expansion of the parts due to rise in temperature. In the usual type of construction, such movement often causes deterioration of the gaskets thereby causing leakage of the reflux liquid.

What I claim is:

1. In apparatus for fractional distillation, a substantially horizontal bubbler plate comprising a plurality of independent receptacles adapted to be placed in spaced relation to the walls of a fractionating column, said receptacles being spaced from each other, the edges of each receptacle being upturned, a cover cap extending horizontally from one receptacle to another, said cover cap having depending walls extending below the uppermost portion of the upturned edges of said receptacles, a bubbler cap extending horizontally from one receptacle to another, said bubbler cap having depending walls extending below the uppermost portion of the upturned edges of said receptacles, the walls of said bubbler cap extending below said edges to a less extent than do the walls of said cover cap.

2. In apparatus for fractional distillation, a substantially horizontal bubbler plate comprising a plurality of independent receptacles adapted to be placed in spaced relation to the walls of a fractionating column, said receptacles being spaced from each other, the edges of each receptacle being upturned, a cover cap extending horizontally from one receptacle to another, said cover cap having depending walls extending below the uppermost portion of the upturned edges of said receptacles, a bubbler cap extending horizontally from one receptacle to another, and spaced from said receptacles, said bubbler cap having depending walls extending below the uppermost portion of the upturned edges of said receptacles, the walls of said bubbler cap extending below said edges to a less extent than do the walls of said cover cap.

3. In apparatus for fractional distillation, a substantially horizontal bubbler plate comprising an annular channel-shaped member, a plurality of independent receptacles bounded by said member, at least two of said receptacles having edges adjacent the edge of said annular member, the edges of said receptacles adjacent the edge of said annular member being upturned and spaced from each other, caps extending horizontally from the annular member to the receptacles, said caps having depending walls extending below the uppermost portions of the upturned edges of said receptacles and said annular member, said receptacles being spaced from each other, the edges of each adjacent the edges of another receptacle being upturned, and other caps extending horizontally from one receptacle to another, said last mentioned caps having depending walls extending below the uppermost portion of the upturned edges of adjacent receptacles.

4. In apparatus for fractional distillation, a substantially horizontal bubbler plate comprising a plurality of independent receptacles having upturned peripheral edges positioned with a space between each two adjacent receptacles, caps with depending walls covering each of said spaces, the lower edges of said walls extending below the upper edges of the walls of the receptacles, an opening in the bottom of one of said receptacles, an upwardly extending wall around said opening, a member for covering said opening, said member spaced from the upwardly extending wall and having depending walls extending below the upper edges of the walls of the receptacle.

5. In apparatus for fractional distillation, a substantially horizontal bubbler plate comprising a plurality of independent receptacles having upturned peripheral edges with spaces between them, elongated apertures in the bottoms of said receptacles, upwardly extending walls around said apertures, members for covering the spaces between adjacent receptacles and for covering said apertures, said members having depending walls extending below the upper edges of the walls of said receptacles, whereby there is formed a plurality of paths for the flow of liquid.

6. In apparatus for fractional distillation, a substantially horizontal bubbler plate assembly comprising a receptacle having a vapor uptake, a bubbler cap covering said uptake and extending into said receptacle, a second receptacle spaced from said first mentioned receptacle, and a cover cap disposed above adjacent walls of said receptacles and having a portion extending into said receptacle first mentioned a greater distance than does said bubbler cap.

7. In apparatus for fractional distillation, a substantially horizontal bubbler plate assembly comprising in combination a receptacle forming a peripheral channel, a pan provided with at least one liquid outlet within the region enclosed by said channel, means for passing liquid from said channel to said last mentioned pan, and means for directing flow of liquid in two directions along said channel to said first mentioned means.

8. In apparatus for fractional distillation, a substantially horizontal bubbler plate comprising an annular member, having an upturned inner edge, an independent receptacle bounded by said member and having its edge adjacent the inner edge of said member upturned and spaced from said inner edge, a cover cap extending horizontally from said annular member to said receptacle, said cover cap having depending walls extending below the uppermost portion of the upturned edges of the receptacle, a bubbler cap extending horizontally from said annular member to said receptacle, said bubbler cap having depending walls extending below the uppermost portion of the upturned edges of the receptacle, the walls of the bubbler cap extending below said edges to a less extent than do the walls of the cover cap.

9. In apparatus for fractional distillation, a substantially horizontal bubbler plate comprising an annular member having an inner upturned edge, a plurality of independent receptacles bounded by said annular member, at least two of said receptacles having edges adjacent the edge of said annular member, the edges of said receptacles adjacent the inner edge of said member being upturned and spaced from said last mentioned edge, the edges of adjacent receptacles being upturned and spaced from each other; cover caps and bubbler caps extending horizontally, some from the annular member to at least one of the receptacles and some between adjacent receptacles, each cap having depending walls, some of which extend below the uppermost portion of the upturned edges of said annular member and the adjacent upturned edges of the receptacles, and some of which extend below the uppermost portions of the upturned edges of adjacent receptacles, the walls of the cover caps extending below said edges to a greater extent than do the walls of the bubbler caps.

RICHARD B. CHILLAS, Jr.